United States Patent Office

3,224,940
Patented Dec. 21, 1965

3,224,940
ANTACID COMPOSITIONS AND METHOD OF USING SAME
Cameron Ainsworth, Frederick C. Blubaugh, and Le Roy A. Springman, Indianapolis, and James R. Zapapas, Martinsville, Ind., assignors to Eli Lilly and Company, Indianapolis, Ind., a corporation of Indiana
No Drawing. Filed Dec. 18, 1961, Ser. No. 160,309
9 Claims. (Cl. 167—55)

This invention relates to novel therapeutic antacid compositions, employing an entirely new concept in the design of antacids. Novel methods for the treatment of hyperacidity also form a part of this invention.

Antacids are employed in the treatment of hyperchlorhydria and peptic ulcer. The efficacy is based on their ability to neutralize the acidity of the gastric juice and restore the stomach to a desirable pH level without adverse side effects. In short, an ideal antacid effectively and rapidly neutralizes acid, has a prolonged action, and is palatable and inexpensive. In addition, an ideal antacid obviates the problems of systemic alkalosis, acid rebound, diarrhea or constipation, interference with digestion, irritation to the stomach, and carbon dioxide release on reaction with acid. An antacid possessing the above properties would provide a significant contribution to gastroenterology.

A primary object of this invention is to provide such an antacid, as well as methods for the use thereof in the treatment of hyperacidity. These and other objects of this invention appear more fully hereinafter.

The antacid compositions of this invention employ an entirely new concept in the design of therapeutic antacids in that these compositions contain an organic polymer; specifically, a nontoxic, polyalkyleneimine polymer. This polymer, in combination with conventional antacid ingredients, as, for example, the pharmaceutically acceptable metal bases, results in an excellent therapeutic antacid formulation, which, in addition to its fine antacid characteristics, possesses a heretofore unobtainable palatability.

Of the polyalkyleneimine polymers employed in this invention, polyethyleneimine cross-linked with butadiene dioxide is highly preferred because of the excellent tablet disintegration characteristics which this polymer imparts to tablets containing it. Incorporation of polyethyleneimine cross-linked with butadiene dioxide into a tablet results in a pharmaceutically elegant, rapidly disintegrating tablet in which the cross-linked polyalkyleneimine polymer acts as a highly effective tablet-disintegrating agent. This extremely unexpected characteristic will be discussed more fully hereinafter.

Representative of the novel antacids of this invention, and forming a highly preferred embodiment thereof, is an antacid composition comprising (1) aluminum hydroxide or aluminum oxide, (2) magnesium hydroxide or magnesium oxide, and (3) polymeric polyethyleneimine, cross-linked with butadiene dioxide. Such formulations have the above-specified properties of an ideal antacid and constitute a striking improvement over conventional antacids. The point is best illustrated with reference to a specific example.

EXAMPLE I

The antacid features of a formulation in dosage unit form of 4 g. of a 10 percent aluminum hydroxide compressed gel (400 mg. $Al_2O_3$), 140 mg. of magnesium oxide, and 100 mg. of polyethyleneimine cross-linked with butadiene dioxide were demonstrated by in vitro titration using a modified method described by S. M. Beekman, J. Am. Pharm. Assoc., Sc. Ed., 49, 191 (1960). This titration technique closely simulates the action of antacids in the stomach. Briefly, the technique involves adding a dose of antacid to a volume of synthetic gastric juice and measuring the pH. At ten-minute intervals one-tenth of the volume is withdrawn and replaced by fresh synthetic gastric juice (analogous to the normal discharge of the stomach contents and replacement with fresh gastric secretion), and the pH is recorded. This procedure is continued for two hours. The antacid mixture of this example, when added to simulated gastric juice containing 9.4 milli-equivalents of acid, gave a pH rise to 4 within five minutes and sustained the pH at the optimum value of 4 to 4.5 for two hours. Furthermore, one and one-half doses of the antacid in the system gave a very similar titration curve at the 4 to 4.5 pH level, which indicates that buffering occurs to maintain the optimum pH in cases of overdosage.

When compared with inorganic antacids (e.g., metal bases), the above results represent a 50 to 100 percent longer sustained period at a pH of 4 to 4.5. In addition, the antacid of Example I adjusted the system to the optimum pH range of 4 to 4.5 in just about half the time of the most effective inorganic antacid, aluminum hydroxide gel. The polymer-containing antacid also was characterized by a sustained buffering action at the pH 4 to 4.5 level, thereby obviating undesirable alkalosis.

Thus, although a mechanism has not been firmly established, it appears likely that the antacid compositions of this invention involve an entirely new concept in antacid therapy—the in situ formation of a highly effective buffering agent through interaction of a polymer and the metal base constituents of the antacid. This theory is further bolstered by the fact that measurement of the degree of binding between the aluminum hydroxide and a standard binding agent disclosed that a substantial portion of the aluminum hydroxide in the polymer-containing antacid had been consumed prior to neutralization with acid. This indicates an in situ interaction between the aluminum hydroxide and the polymer ingredient of the antacid composition, resulting in the formation of an aluminum hydroxide-polyethyleneimine polymer complex. Thus, upon this basis, the novel polymer-containing antacid compositions of this invention are truly a radical departure from conventional antacids, involving a significant new concept in therapeutic antacid design.

The polyalkyleneimine polymers utilized in the antacid compositions of this invention are, in general, nontoxic polymers wherein the alkylene moiety preferably contains 2 to 4 carbon atoms. The term "polyalkyleneimine polymer" as used herein is intended to include cross-linked polyalkyleneimines. These cross-linked materials are provided by cross-linking a polyalkyleneimine with linking groups containing from about 2 to 10 carbon atoms, and having a molecular weight of about 20 to about 200. The cross-links of the cross-linked polyalkyleneimine polymers employed in this invention constitute bridges connecting nitrogen atoms of the polyalkyleneimine, the cross-links coupling with the nitrogen atoms by means of carbon-to-nitrogen bonds. In general, the polyalkyleneimine polymers utilized in this invention are polyethyleneimine and polypropyleneimine polymers, the polyethyleneimine polymers presently being especially preferred.

As discussed above, the polyalkyleneimine polymers are formulated with conventional antacids (generally inorganic antacids), such as the well-known pharmaceutically acceptable metal bases. These metal bases are preferably combined as either the oxide or the hydroxide with the polyalkyleneimine. Although more than one metal base can be employed in a single formulation, it is preferred that at least one be amphoteric, as, for example, aluminum hydroxide or aluminum oxide. In one mixed-base formulation, the polyalkyleneimine polymer is combined with an amphoteric aluminum base and a base of a Group IIA element of the periodic chart of the elements (Lange, Norbert A. Handbook of Chemistry. New York: McGraw-Hill Book Company, Inc., 1961, pp. 56–57). Representative of the metal bases utilized in the antacid compositions of this invention are: aluminum hydroxide, dihydroxyaluminum aminoacetate, magnesium hydroxide, calcium hydroxide, barium hydroxide, aluminum phosphate, magnesium trisilicate, magnesium carbonate, calcium carbonate, sodium bicarbonate, and bismuth subcarbonate—in short, any compound capable of neutralizing or relieving stomach acidity can be employed as one of the constituents of the antacid compositions of this invention. Particularly preferred are pharmaceutically acceptable, amphoteric metal bases, either alone, or in combination with a base of a Group IIA element, such as a magnesium base.

The following example discloses an antacid formulation of this invention wherein noncross-linked polyethyleneimine is employed.

EXAMPLE II

A dosage unit formulation of 400 mg. of $Al_2O_3$ (in the form of a 10 percent aluminum hydroxide gel, U.S.P.), 140 mg. of MgO, and 100 mg. of polyethyleneimine was titrated according to the procedure of Example I. This formulation resulted in a pH rise to 4.25 in 5 minutes and a sustained pH near 4 for 100 minutes.

This example clearly demonstrates that a noncross-linked polyethyleneimine polymer, combined in an antacid formulation with a pharmaceutically acceptable metal base, produces an excellent antacid. Similar results are obtained when polypropyleneimine is employed in place of the polyethyleneimine of Example II. Furthermore, when polypropyleneimine cross-linked with butadiene dioxide is employed in place of the cross-linked polyethyleneimine utilized in Example I, an effective antacid is produced. These results substantiate that both cross-linked and noncross-linked polyalkyleneimine polymers can be utilized in the antacid formulations of this invention.

The following formulations are further representative of the novel polymer-containing antacids of this invention:

100 to 600 parts of polyethyleneimine cross-linked with butadiene dioxide
600 parts of aluminum hydroxide
100 to 300 parts of polyethyleneimine cross-linked with butadiene dioxide
600 parts of aluminum hydroxide
150 parts of magnesium oxide
100 to 300 parts of polypropyleneimine cross-linked with butadiene dioxide
600 parts of aluminum hydroxide
300 parts of magnesium trisilicate
100 to 300 parts of polybutyleneimine
600 parts of aluminum hydroxide
150 parts of calcium carbonate
100 to 300 parts of polyethyleneimine
600 parts of aluminum hydroxide
150 parts of magnesium carbonate
100 to 300 parts of polyethyleneimine cross-linked with epichlorohydrin
600 parts of dihydroxy aluminum aminoacetate
100 to 300 parts of polyethyleneimine cross-linked with butadiene dioxide
600 parts of aluminum hydroxide
300 parts of sodium bicarbonate These formulations, upon being tested in the simulated gastric system of Example I, produce desirable titration results.

The polymer-containing antacids of this invention can be fabricated into tablets, filled capsules, creams, or suspensions, and the like, following procedures well known to the art. The preparations can contain additional ingredients, such as pharmaceutical extending media (excipients), suspending agents, binders, bonding agents, preservatives, flavors, coloring agents, and the like.

The range of doses of the antacids of this invention varies widely, as is customary in antacid therapy. The administration of a dose based on total anhydrous active constituents of about 300 mg. to about 3 g. of the polymer-containing antacid will relieve normally encountered hyperacidity of the transient type. However, it is to be understood that the doses required will vary depending upon the patient and the nature and acuteness of the gastric hyperacidity. The compositions of this invention are outstandingly suited for wide dosage variations, since large doses have not been found to produce alkalosis, but, to the contrary, rapidly produce and maintain a beneficial pH range over an extended period of time.

In formulating the antacid preparations of this invention, it is desirable to employ the polyalkyleneimine polymer constituents thereof in a proportion ranging from about 10 percent to about 60 percent of the weight of the total ingredients of the antacid formulation. When a pharmaceutically acceptable amphoteric compound of a metal base is employed as one of the constituents of the antacid, it is usually desirable to employ the polyalkyleneimine polymer in a proportion of about 10 percent to about 100 percent of the weight of said amphoteric compound.

As has been demonstrated above, a polyalkyleneimine cross-linked with butadiene dioxide, when combined with conventional antacid ingredients, results in an excellent therapeutic antacid formulation, which exhibits ideal antacid characteristics and possesses a heretofore unobtainable palatability. However, in addition to these excellent antacid characteristics, a cross-linked polyalkyleneimine polymer is highly suitable for formulation into a medicinal tablet which is characterized by its rapid disintegration. A preferred tablet, which is exemplary of this last embodiment, comprises a drug and a polyethyleneimine polymer cross-linked with butadiene dioxide.

Table I clearly demonstrates the tablet-disintegrating properties of polyethyleneimine cross-linked with butadiene dioxide. This table sets forth tablet disintegration results in water purified at 37° C., ±2°, employing the tablet disintegration test described in the United States Pharmacopoeia, XVI, on pages 934–935. In this table, three tablet formulations were used. These formulas are:

*Table formula 1*

| | Mg. |
|---|---|
| Aluminum hydroxide (equivalent to 200 mg. $Al_2O_3$) | 390 |
| Magnesium hydroxide (equivalent to 72 mg. MgO) | 104 |
| Mannitol | 290 |
| Sodium carboxymethylcellulose | 12 |
| Magnesium stearate | 38 |
| Theoretical tablet weight | 834 |

Tablet formula 2

| | Mg. |
|---|---|
| Acetohexamide [1] | 500 |
| Starch powder | 100 |
| Polyvinyl pyrrolidone | 30 |
| Stearic acid | 14 |
| Magnesium stearate | 6 |
| Theoretical tablet weight | 650 |

[1] N-p-acetylphenylsulfonyl-N'-cyclohexylurea [see Proc. Soc. Exp. Biol. Med., 107, 583–585 (1961)].

Tablet formula 3

| | Mg. |
|---|---|
| Thyroid, U.S.P. | 49.2 |
| Milk sugar | 46.8 |
| Starch powder | 7.5 |
| Magnesium stearate | 0.5 |
| Theoretical tablet weight | 104.0 |

TABLE I.—DISINTEGRATION TIME

| | Polymer [1] | Control (no polymer) |
|---|---|---|
| Tablet Formula 1 | 30 seconds [2] | 16 minutes. |
| Tablet Formula 2 | 3 minutes [2] | 21 minutes. |
| Tablet Formula 3 | 1.5 minutes [3] | 3.5 minutes. |

[1] Polyethyleneimine cross-linked with butadiene dioxide.
[2] 6 percent of tablet as polymer.
[3] 5 percent of tablet as polymer.

Based on this table, polyethyleneimine cross-linked with butadiene dioxide, when formula into the tablets, improved disintegration times no less than 2.3 times and as high as 32 times those of the tablet controls which contained no polymer. Furthermore, the tablets containing the polymer were extremely hard, as measured by the Strong-Cobb hardness tester—in fact, Tablet Formulas 1 and 3, with polymer, were harder than the same formulas without the polymer.

Other polyalkyleneimine polymers, when combined with a drug, also exhibit excellent tablet disintegration properties. Exemplary of these other polymers are polyethyleneimine cross-linked with ethylene bromide, polyethyleneimine cross-linked with ethyl succinate, polyethyleneimine cross-linked with epichlorohydrin, and polyethyleneimine cross-linked with methyl methacrylate.

The term "drug" as used herein naturally refers to drugs capable of formulation into a tablet, i.e., solid drugs. Other than this limitation, however, the term is employed in its broadest sense as indicating any substance or composition which will give a pharmacological response. Ammonium chloride, acetylsalicylic acid, potassium iodide, para-aminosalicylic acid, sodium salicylate, ephedrine, barbital, thyroid, pancreatin, theophylline, sex hormones, hydantoins, trimethadione, ferrous sulfate, potassium thiocyanate, erythromycin, sodium chloride, potassium chloride, secobarbital, potassium nitrate, methenamine-sodium chloride, emetine combined with bismuth compounds, diethylstilbestrol, aminophyllin, theobromine, sodium acetate, bile salts, extract of bile, dithiazanine, gentian violet, anthelmintics, trypsin, salts of mercury, sodium ricinoleate, and related drugs are representative.

It is preferred that the drug included in the rapidly disintegrating tablets of this invention be an insoluble inorganic drug, in particular, a pharmaceutically acceptable, inorganic antacid, such as those defined hereinbefore. Formulation of these medicaments into a tablet containing a cross-linked polyalkyleneimine polymer, as defined herein, results in a pharmaceutically elegant, rapidly disintegrating tablet.

In general, the polyalkyleneimine polymers utilized in this invention have a molecular weight ranging from about 800 to about 100,000, and usually about 20,000 to about 40,000. Those having an average molecular weight of about 30,000 to 40,000 are preferred, since these latter materials are particularly economical and commercially available. In general, the polyalkyleneimine polymers utilized herein have a viscosity at 20° C., ranging from about 10,000 to 35,000 centipoises.

Further illustrative of the cross-linked polyethyleneimine polymers employed in the antacid compositions of this invention are cross-linked polyethyleneimine polymers or cross-linked polypropyleneimine polymers wherein the cross-linking agents are epichlorohydrin, ethylene bromide, ethylene chloride, ethyl succinate, ethyl maleate, ethyl fumarate, ethyl adipate, ethyl terephthalate, ethyl citrate, ethyl tartrate, ethyl malonate, trimethylene bromide, hexamethylene bromide, octamethylene bromide, methyl methacrylate, methyl acrylate, and butadiene dioxide. These cross-linked polypropyleneimine polymers are readily formulated with the other ingredients of the antacid preparations of this invention in the form of compressed tablets, liquid suspensions, or capsules.

Any polyalkyleneimine preparation, obtainable from the $C_2$–$C_4$ monomer, can be employed as starting material in the preparation of the cross-linked polymers employed in the compositions of the invention if cross-linked polyalkyleneimine polymers of a solid character are provided thereby. It has been found desirable to employ polyalkyleneimine preparations which have the higher average molecular weights since, in general, the larger the average molecular weight, the better the pharmaceutical characteristics of the cross-linked polyalkyleneimine polymeric products. Commercially available polyalkyleneimine polymer preparations have been found to be satisfactory for the preparation of cross-linked polymers, for example, a 50 percent by weight aqueous solution of polyethyleneimine or polypropyleneimine.

A number of agents can be employed to provide the cross-links having the properties set forth above. The cross-linking agents include lower alkyl esters of polybasic carboxylic acids, such as malonic, succinic, maleic, fumaric, adipic, terephthalic, citric, and tartaric acids; lower alkyl esters of lower alkenyl monobasic carboxylic acids, such as methyl acrylate, ethyl methacrylate, and ethyl acrylate; polymethylene halides, such as ethylene bromide, ethylene chloride, trimethylene bromide, hexamethylene bromide, and octamethylene bromide; compounds having epoxide functional groups, such as epichlorohydrin, epibromohydrin, and butadiene dioxide; esters of halo-substituted alkylmonobasic acids, such as ethyl chloroacetate and methyl β-chloropropionate; acid halides of such halo-substituted acids; and the like. Presently preferred cross-linking agents are epichlorohydrin, succinate esters, acrylate esters, 2,3-dibromo-1,4-dihydroxybutane, 1,4-dibromo-2,3-dihydroxybutane, and highly preferred butadiene dioxide.

Butadiene dioxide is especially preferred as a cross-linking agent, as polyalkyleneimine polymers are produced therewith which exhibit superlative antacid properties upon incorporation into the antacid composition of this invention. Thus, an embodiment of this invention is an antacid composition comprising a metal base and a nontoxic, water-insoluble, solid, cross-linked polyalkyleneimine polymer wherein the polyalkyleneimine polymer is cross-linked with butadiene dioxide. Such a cross-linked polyalkyleneimine polymer is obtained by reacting the polyalkyleneimine with butadiene dioxide, thereby providing 2,3-dihydroxytetramethylene cross-links coupling with polyalkyleneimine nitrogen atoms by means of carbon-to-nitrogen bonds. Thus, the butadiene dioxide is attached at each end to polyalkyleneimine nitrogen atoms—the cross-linking moiety being 2,3-dihydroxytetramethylene. The novel polyalkyleneimine polymer preferably contains 2 to 4 carbon atoms in the alkylene moiety, as, for example, do polypropyleneimine and polyethyleneimine. A highly preferred polymer is a nontoxic, water-insoluble, cross-linked polyethyleneimine polymer wherein the polyethyleneimine polymer is cross-linked with butadiene dioxide, since this polymer, when formulated in an antacid preparation of this invention, exhibits excellent antacid properties.

The cross-linked polyalkyleneimine polymers are prepared by reacting a polyalkyleneimine and a cross-linking agent in the presence of an inert solvent. The solvent can be water or an aqueous solvent mixture containing a percentage of a water-miscible, inert organic liquid, such as dimethylformamide or a lower alcohol, for example, methanol, ethanol, or propanol. A preferred solvent is an aqueous mixture containing about 0.1 to 2 parts of such an inert organic liquid for each part of water.

A satisfactory cross-linked polyalkyleneimine polymeric product is provided by the addition with stirring of about 0.10 to 1.0 part by weight of cross-linking agent for each part of polyalkyleneimine employed. The reaction is permitted to proceed for a sufficient time to provide the desired solid, cross-linked polyalkyleneimine polymer, a 15- to 20-hour period being generally ample. At the end of the reaction period, the reaction product is thoroughly washed to remove unwanted reaction products as well as any excess reactants. For example, to remove halide, the washing can be accomplished by permitting the reaction product to stand for several hours in alkaline aqueous solution, such as 1 N sodium hydroxide, followed by thorough water washing.

A preferred polymeric product having superior grinding and formulating characteristics is obtained by employing about 0.2 to about 0.6 part by weight of epichlorohydrin as cross-linking agent for each part of polyethyleneimine. In addition, a highly preferred, smooth product can be obtained directly without grinding and sizing by employing about 0.01 to about 0.19 part by weight of epichlorohydrin for each part of polyethyleneimine.

When the cross-linked polymer is a grindable solid, it should be finely comminuted, desirably to a particle size of sufficient fineness to permit passage through a No. 100 screen of U.S.P. sieve series. Preferably, the final particle size falls in the range of about 1 $\mu$ to about 100 $\mu$. The fine particle size permits a more efficient utilization of the polymer as an antacid, and also aids in the formulation of the polymer into a palatable antacid composition. The comminution can be effected either in the wet or dry state by conventional grinding means. To circumvent any grinding difficulties which might occasionally arise as a result of some slight tendency toward gumminess of some of the cross-linked polymers, it is at times desirable to carry out the grinding with the polymer in the frozen state; this is readily accomplished by mixing solid carbon dioxide with the polymer, and grinding the chilled mixture.

The following examples more fully illustrate the preparation of cross-linked polyalkyleneimine polymers used in this invention:

EXAMPLE III.—PREPARATION OF CROSS-LINKED POLYETHYLENEIMINE POLYMER EMPLOYING EPICHLOROHYDRIN AS CROSS-LINKING AGENT 3 l. of ethanol and 1.5 kg. of polyethyleneimine in 1.5 l. of water are combined, and the mixture is cooled to about 15° C. 600 ml. of epichlorohydrin are added with stirring to the ethanol mixture. Upon completion of the addition of the epichlorohydrin, the reaction mixture is transferred to glass trays to a depth of about 2 inches and is permitted to stand for a 24-hour period. The reaction product is removed from the glass trays and ground with a hammer mill. The solid, ground product of cross-linked polyethyleneimine polymer is washed by permitting the polymeric product to stand in 12 l. of 1 N sodium hydroxide for 24 hours. The sodium hydroxide mixture is filtered. The precipitate of cross-linked polyethyleneimine polymer is washed repeatedly with water until the pH of the aqueous wash reaches about neutrality. The washed, cross-linked polyethyleneimine polymeric product is air dried with hot air at 125° C. until the final product has about 5 percent water by weight. The final product is a white, grindable solid.

Whereas the above product is a grindable solid, a smooth paste-like solid can be provided as follows: Two hundred grams of 50 percent aqueous polyethyleneimine and 4 ml. of epichlorohydrin are mixed and allowed to stand at room temperature for 3 days. The Artgum eraser-like material is ground in a mortar with water and then is collected by suction filtration. The moist material, containing 80 percent water, is diluted with an equal weight of water and roller milled to yield a smooth, tasteless paste.

EXAMPLE IV.—PREPARATION OF CROSS-LINKED POLYETHYLENEIMINE POLYMER EMPLOYING BUTADIENE DIOXIDE AS CROSS-LINKING AGENT

Cross-linked polyethyleneimine polymer employing butadiene dioxide as cross-linking agent is prepared according to the procedure described in Example III, using 5 g. of polyethyleneimine in 5 ml. of water and 2 g. of butadiene dioxide. The cross-linked product is a white, grindable, insoluble solid.

Whereas the above product is a grindable solid, a smooth paste-like solid can be produced as follows: 1,200 g. of 50 percent polyethyleneimine and 50 ml. (from 5 to 100 ml. given an equally desirable cross-linked polymer) of butadiene dioxide are stirred vigorously for two minutes. A solid forms and, after standing for two hours, the product is ground (a roller mill can be used) and washed with water. An aqueous suspension of the cross-linked polymer is treated with carbon dioxide gas to give a tasteless product that is collected by suction filtration. This product contains approximately 50 to 90 percent water by weight.

EXAMPLE V.—PREPARATION OF COMPRESSED TABLETS

A typical formulation for the preparation of compressed tablets is as follows:

| | Per tablet, mg. |
|---|---|
| Aluminum oxide (as aluminum hydroxide) | 200 |
| Magnesium oxide (as magnesium hydroxide) | 72 |
| Polyethyleneimine cross-linked with butadiene dioxide (anhydrous) | 50 |
| Diluents | 230 |
| Nonvolatile flavors | 12 |
| Volatile flavors | .0015 |
| Lubricants | 20 |

Two typical methods for fabricating the antacid tablets of this invention follow:

*Method 1.*—The active, inorganic antacid constituents, diluents, and nonvolatile flavoring components are comminuted into a fine state of subdivision. This dry mix is granulated with a water-soluble cellulose derivative (e.g., sodium carboxymethylcellulose) dissolved in water and into which polyethyleneimine cross-linked with butadiene dioxide has been uniformly suspended. After drying and sieving, a lubricant (e.g., magnesium stearate) and a volatile flavoring agent (e.g., peppermint oil) are added. After the volatile solvent has dispersed itself throughout the granulation, tablets are compressed.

*Method 2.*—A wet, pasty mass of the inorganic antacid components (e.g., $Al_2O_3$) and polyethyleneimine cross-linked with butadiene dioxide is kneaded, and the wet mass is dried under vacuum and reduced to a fine state of subdivision. An additional antacid (e.g., MgO) constituent, a diluent (e.g., mannitol), and nonvolatile flavoring components (e.g., monosodium glutamate, NaCl, sodium cyclamate, sodium citrate, saccharine) are reduced to a fine state of subdivision and are added and blended. This dry mix is granulated with a water-soluble cellulose derivative (e.g., sodium carboxymethylcellulose). Completion of the tablet is the same as Method 1.

EXAMPLE VI.—PREPARATION OF AN ANTACID LIQUID SUSPENSION 400 g. of aluminum oxide, 140 g. of magnesium oxide, and 100 g. of polyethyleneimine polymer are formulated as a 17 percent by weight pharmaceutical suspension by thorough mixing with sterile distilled water in a Waring blender. A small amount of flavoring is added, and the mixture is bottled.

EXAMPLE VII.—PREPARATION OF ANTACID CAPSULES 400 g. of aluminum oxide, 140 g. of magnesium oxide, and 100 g. of polyethyleneimine cross-linked with butadiene dioxide are uniformly mixed. The mixture is filled, in 670 mg. amounts, into No. 0 gelatin capsules.

We claim:
1. An antacid composition, comprising a pharmaceutically acceptable inorganic antacid and between about 10 percent and about 60 percent by weight of a nontoxic, cross-linked polyalkyleneimine polymer selected from the group consisting of polyethyleneimine and polypropyleneimine wherein the cross-links have from 2 to 10 carbons and are attached at each end to polyalkyleneimine nitrogens.
2. The composition of claim 1, wherein said antacid is an aluminum base and wherein said composition also includes a nontoxic base of a Group IIA element of the periodic chart of the elements.
3. An antacid composition, comprising a nontoxic aluminum base and between about 10 percent and about 60 percent by weight of a nontoxic, cross-linked polyalkyleneimine polymer, selected from the group consisting of polyethyleneimine and polypropyleneimine wherein the cross-links have from 2 to 10 carbons and are attached at each end to polyalkyleneimine nitrogens.
4. The composition of claim 3, wherein said cross-links are 2,3-dihydroxytetramethylene.
5. The composition of claim 3, wherein said cross-linked polyalkyleneimine polymer is polyethyleneimine cross-linked with epichlorohydrin.
6. An antacid composition comprising aluminum oxide, magnesium oxide, and between about 10 percent and about 60 percent by weight of polyethyleneimine cross-linked with butadiene dioxide.
7. A method of treating hyperacidity which comprises orally to a patient administering an effective quantity of a composition comprising a pharmaceutically acceptable inorganic antacid and between about 10 percent and about 60 percent by weight of a nontoxic cross-linked polyalkyleneimine polymer selected from the group consisting of polyethyleneimine and polypropyleneimine wherein the cross-links have from 2 to 10 carbons and are attached at each end to polyalkyleneimine nitrogens.
8. A composition, suitable for formulation into a rapidly disintegrating tablet, comprising an inorganic antacid and between about 10 percent and about 60 perment by weight of a cross-linked polyalkyleneimine selected from the group consisting of polyethyleneimine and polypropyleneimine wherein the cross-links contain 2 to 10 carbon atoms.
9. A medicinal tablet, characterized by its rapid disintegration, comprising an organic antacid and between about 10 percent and about 60 percent by weight of a polyethyleneimine polymer cross-linked with butadiene dioxide.

References Cited by the Examiner

UNITED STATES PATENTS

| 2,554,072 | 5/1951 | Sullivan | 167—72 |
| 2,597,439 | 5/1952 | Bodamer | 167—72 |
| 2,774,710 | 12/1956 | Wade | 167—55 |
| 2,901,443 | 8/1959 | Starck | 260—2 |
| 3,115,490 | 12/1963 | Smith | 260—2 |

FOREIGN PATENTS

| 567,738 | 12/1958 | Canada. |
| 461,354 | 2/1937 | Great Britain. |
| 466,270 | 5/1937 | Great Britain. |
| 466,344 | 5/1937 | Great Britain. |
| 488,553 | 7/1938 | Great Britain. |
| 834,883 | 5/1960 | Great Britain. |

OTHER REFERENCES

Dale: J. of Am. Pharm. Assoc., vol. 44, No. 3, pp. 170–177, 1955.

Wolf: Chem. Abst., vol. 53, p. 8480(d), 1959, abstract of Ger. (East) Patent No. 14,852, July 4, 1958.

JULIAN S. LEVITT, *Primary Examiner.*

MORRIS O. WOLK, LEWIS GOTTS, *Examiners.*